United States Patent
Luo et al.

(10) Patent No.: US 10,346,002 B2
(45) Date of Patent: Jul. 9, 2019

(54) CONTROLLING A PROXY TOOL WITH INJECTED WIDGET CODE

(71) Applicants: HEWLETT-PACKARD DEVELOPMENT COMPANY, L.P., Houston, TX (US); Yang Luo, Shanghai (CN); Zhi-Yuan Jing, Shanghai (CN); Bin Wang, Shanghai (CN); YanYan Ou, Shanghai (CN)

(72) Inventors: Yang Luo, Shanghai (CN); Zhi-Yuan Jing, Shanghai (CN); Bin Wang, Shanghai (CN); YanYan Ou, Shanghai (CN)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 601 days.

(21) Appl. No.: 14/915,371

(22) PCT Filed: Sep. 30, 2013

(86) PCT No.: PCT/CN2013/084746
§ 371 (c)(1),
(2) Date: Feb. 29, 2016

(87) PCT Pub. No.: WO2015/042969
PCT Pub. Date: Apr. 2, 2015

(65) Prior Publication Data
US 2016/0210162 A1    Jul. 21, 2016

(51) Int. Cl.
*G06F 3/0484* (2013.01)
*G06F 11/36* (2006.01)
(Continued)

(52) U.S. Cl.
CPC .............. *G06F 3/0484* (2013.01); *G06F 8/30* (2013.01); *G06F 9/451* (2018.02); *G06F 11/3688* (2013.01); *H04L 67/2819* (2013.01)

(58) Field of Classification Search
CPC ...... G06F 9/4443; G06F 9/451; G06F 3/0484; G06F 8/30; G06F 11/3688; H04L 67/2819
See application file for complete search history.

(56) References Cited

U.S. PATENT DOCUMENTS

| 7,565,332 B2 * | 7/2009 | Williams ............... G06Q 20/10 705/14.14 |
| 8,150,939 B1 * | 4/2012 | Murray ............. G06F 17/30896 709/217 |

(Continued)

FOREIGN PATENT DOCUMENTS

| CN | 101364230 | 2/2009 |
| CN | 101605294 A | 12/2009 |

(Continued)

OTHER PUBLICATIONS

IBM, Using the Manual Test Recording Monitor, 2000 http://pic.dhe.ibm.com/infocenter/rfthelp/v8r3/index.jsp?topic=%2Fcom.ibm.rational.test.ft.doc%2Ftopics%2Fr_mta_rec_toolbar_options.htm.

(Continued)

*Primary Examiner* — Tadesse Hailu

(57) ABSTRACT

A proxy tool can be controlled by injecting widget code into application code of a response to an application request. That response is returned client device such that when the application and widget code are processed, the widget code inserts a widget viewable with the rendered application code. Upon a determination that a subsequent request from the client device corresponds to user interaction with the widget and not the rendered application code, a state of the proxy tool is updated based on the sub sequent request.

12 Claims, 3 Drawing Sheets

(51) Int. Cl.
  *G06F 8/30*   (2018.01)
  *H04L 29/08*  (2006.01)
  *G06F 9/451*  (2018.01)

(56) References Cited

U.S. PATENT DOCUMENTS

| | | |
|---|---|---|
| 8,296,445 B1 | 10/2012 | Hackborn et al. |
| 2002/0188661 A1 | 12/2002 | Casais |
| 2004/0054715 A1 | 3/2004 | Cesario |
| 2007/0022406 A1 | 1/2007 | Liu |
| 2009/0083726 A1* | 3/2009 | Amend ................ H04L 63/105 717/171 |
| 2009/0106769 A1 | 4/2009 | Nakamura |
| 2009/0313601 A1* | 12/2009 | Baird ................ G06F 8/34 717/106 |
| 2011/0246879 A1 | 10/2011 | White et al. |
| 2011/0289428 A1* | 11/2011 | Yuen ................ H04L 51/04 715/752 |
| 2012/0023407 A1* | 1/2012 | Taylor ................ G06F 3/04842 715/731 |
| 2012/0188661 A1 | 7/2012 | Demmer |
| 2012/0290940 A1* | 11/2012 | Quine ................ G06F 8/34 715/744 |
| 2012/0290959 A1* | 11/2012 | Quine ................ G06F 8/34 715/765 |
| 2012/0291005 A1 | 11/2012 | Quine |
| 2013/0055289 A1 | 2/2013 | Maltese et al. |
| 2013/0290203 A1* | 10/2013 | Purves ................ G06Q 50/01 705/319 |
| 2014/0052617 A1* | 2/2014 | Chawla ................ G06Q 20/12 705/39 |
| 2014/0181725 A1* | 6/2014 | Yang ................ G06F 9/451 715/777 |

FOREIGN PATENT DOCUMENTS

| | | |
|---|---|---|
| CN | 101833417 A | 9/2010 |
| CN | 101887396 | 11/2010 |
| CN | 102339282 A | 2/2012 |

OTHER PUBLICATIONS

State Intellectual Property Office of the P.R. China, International Search Report and Written Opinion, dated Jun. 24, 2014, 13 pages, Beijing, China.

* cited by examiner

CONTROLLING A PROXY TOOL WITH INJECTED WIDGET CODE

CROSS-REFERENCE TO RELATED APPLICATION

This application is a U.S. National Stage Application of and claims priority to International Patent Application No. PCT/CN2013/084746, filed on Sep. 30, 2013, and entitled "CONTROLLING A PROXY TOOL WITH INJECTED WIDGET CODE," the entire contents of which are hereby incorporated in its entirety.

BACKGROUND

Tools for testing applications utilize scripts to emulate real users. The scripts include a series of requests from a client directed to an application. The scripts can also include corresponding response from the application. Scripts can be created by recording a requests generated by a real user and corresponding responses. Thus, when executed, the script replays that user's interaction with the application.

DRAWINGS

DETAILED DESCRIPTION

Introduction

Tools for recording interactions between a client device and an application can reside on a proxy server positioned between the client device and a server hosting the application. Communication between the client device and the application are routed through the proxy server allowing the proxy tools to record client requests and corresponding application responses. The application can be exposed to a user via a graphical user interface (GUI) displayed by a web browser or other application executing on the client device. A GUI for controlling the script recording tool can also be displayed by that browser or other application. Using the recording tool's GUI, a user can instruct the tool to begin recording. Through the application's GUI the user can interact with the application making a series of requests that are then recorded by the recording tool.

Embodiments described below operate to inject code for the recording tool's GUI in to the code for the application's GUI. When processed by the client device, the recording tool's GUI is viewable with the application's GUI. For client devices having limited display size, the recording tool's GUI may overlay the application's GUI. Where display size is not a limiting factor, the recording tool's GUI may be displayed adjacent to the application's GUI. In this fashion a user interacting with the application to generate the script need not switch between a screen for the application GUI and a screen for the recording tool's GUI. Instead, the user can interact with both on the same screen.

The following description is broken into sections. The first, labeled "Example" describes example screen views of an application GUI displayed with a recording tool's GUI. The second, labeled "Components," describes examples of various physical and logical components for implementing various embodiments. The third section, labeled "Operation," describes steps taken to implement various embodiments.

EXAMPLE

Figure 1:
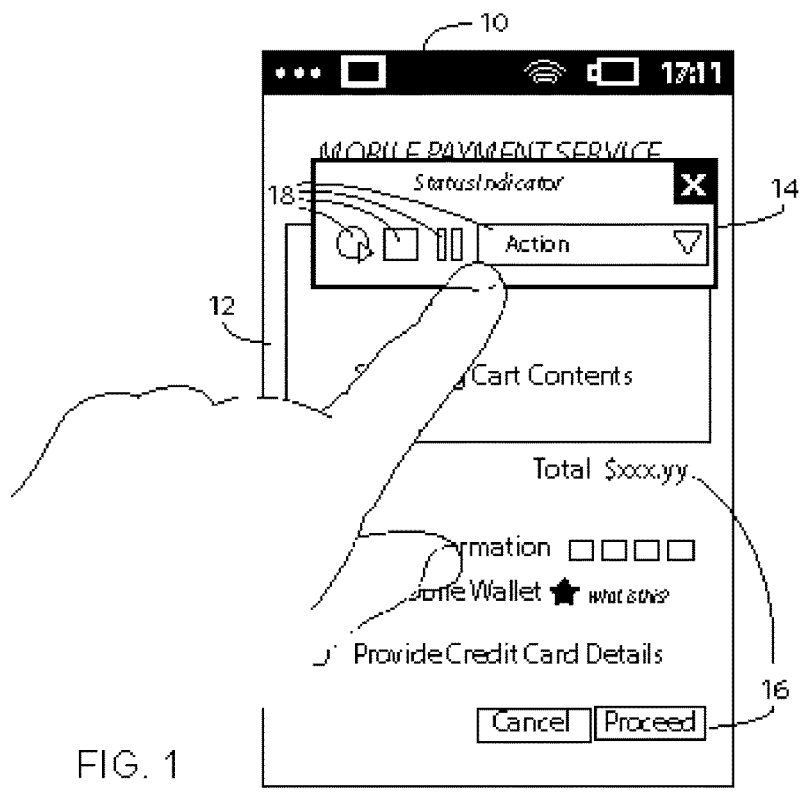
FIGS. 1 and 2 depict example screen views of an application's graphical user interface displayed with an interface for interacting with a proxy tool.
Figure 2:
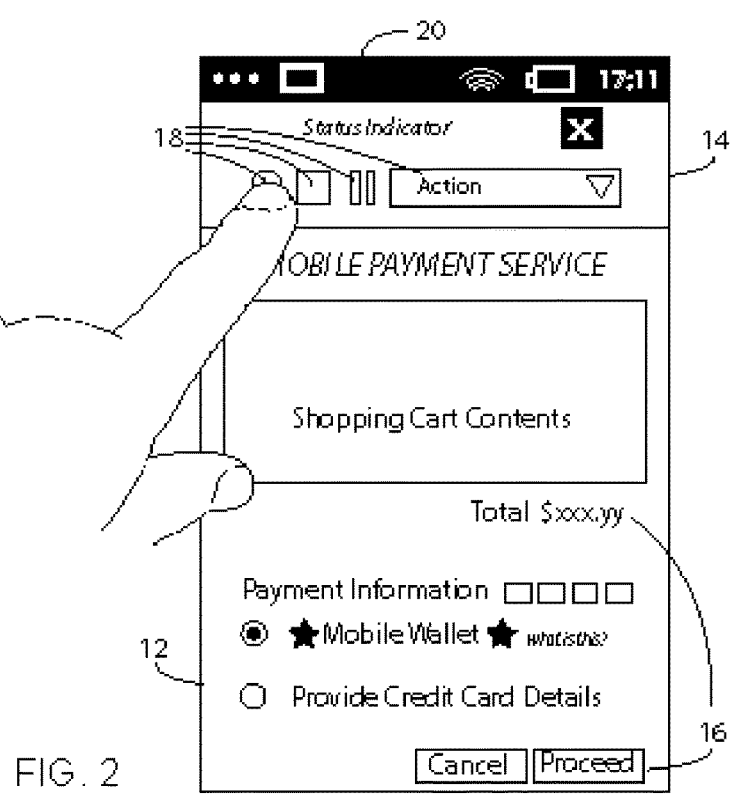

FIGS. 1 and 2 depict example screen views generated using techniques described below. In these screen views, a user is able to interact with a recording tool's GUI and an application's GUI without the need to change screens. Starting with FIG. 1, screen view 10 includes application user interface 12 and widget 14. Here, application interface 12 includes controls 16 for interacting with an application. Widget 14 includes controls 18 for interacting with the recording tool. In this example, widget 14 overlays application interface 12 allowing the user to, for example, instruct the recording tool to begin recording the user's interaction with the application. In the same screen 10, the user can then begin interacting with the application interface 12 and later use the widget 14 to stop the recording.

FIG. 2 depicts screen view 20 in which widget 14 does not overlay application interface 12. Instead widget 14 is positioned immediately adjacent to application interface 12. Again, in the same screen 20, the user can utilize widget 14 to instruct the recording tool to begin recording and then interact with application interface 12. The adjacent layout of FIG. 2 may prove beneficial when overlaying widget 14 hampers user interaction with application interface 12.

Figure 3:
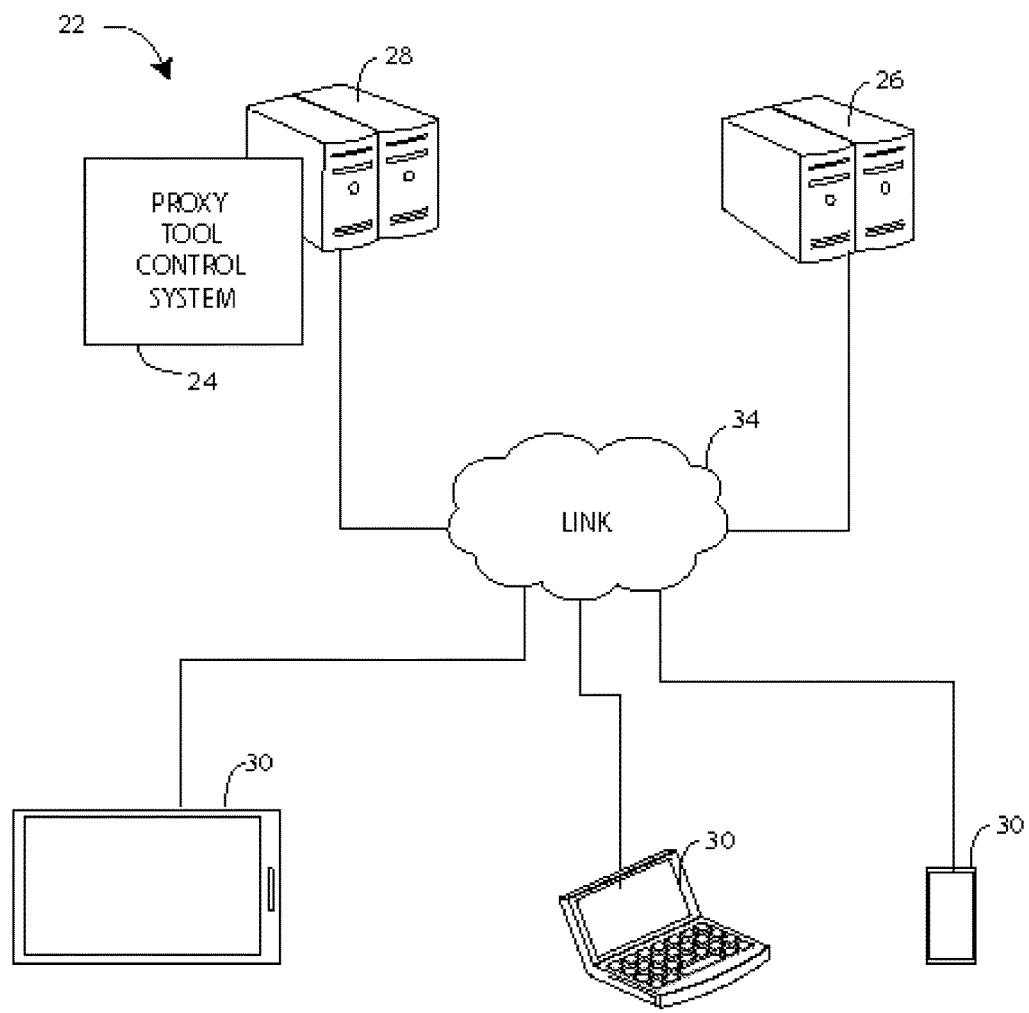
FIG. 3 is a block diagram depicting an example environment in which embodiments may be implemented.

Components:

FIG. 3 depicts an example environment 22 in which embodiments may be implemented as proxy tool recording control system 24. Environment 22 is shown to include application server device 26, proxy server device 28, and client devices 30. Components 26-30 are interconnected via link 34 Link 34 represents generally any infrastructure or combination of infrastructures configured to enable electronic communication between components 26-30. For example, link 34 may represent the internet, one or more intranets, and any intermediate routers, switches, and other interfaces.

Application server device 26 represents any computing device configured to host an application for client devices 30. Proxy server device 28 represents generally any computing device configured function as an intermediary for requests from client devices 30 seeking resources from application server device 26. Client device 30 connects to proxy server device 28 making a request for an application served by application server device 26. Proxy server device 28 can process the request and pass it on to application server device 26. Responses to the request are returned to proxy server device 28, processed, and then passed on to the client device 30. Stated another way, software executing on proxy server device 28 intercepts requests from client device 30 and corresponding responses from application server device 26. That software can then process those requests and responses as desired before passing them on to their intended targets. Client devices 30 represent generally any computing device with which a user may interact to communicate with application server device 26 via proxy server device 28.

Proxy tool control system 24 is implemented using proxy server device 28 and is configured to intercept and process communications between client device 30 and application server device 26. Explained in more detail with respect to FIGS. 4-7, system 24 modifies a response from application server device 26 to include widget code and passes that response to client device 30. When processed, the modified response causes the client device to display a widget along with an application interface. Through the widget, a user can cause a control the proxy tool. In an example, the proxy tool may be controlled to start and stop recording data from future requests and responses between client device 30 and application server device 26.

Figure 4:
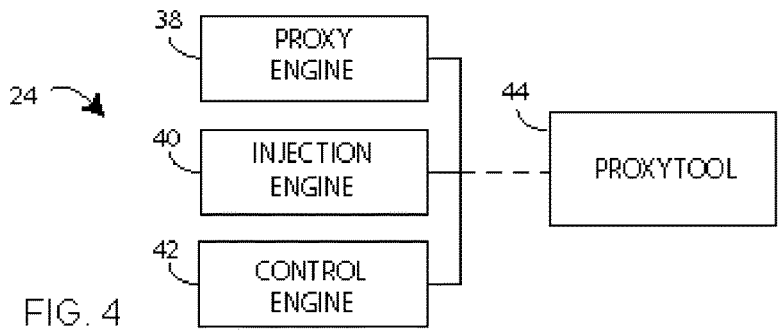
FIG. 4 is a block diagram depicting an example of a system for managing a sensory factor.
Figure 5:
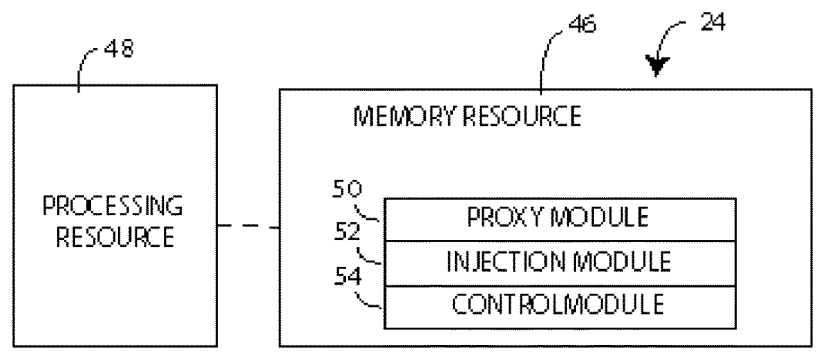
FIG. 5 is a block diagram depicting a memory resource and a processing resource according to an example.

FIGS. 4 and 5 depict examples of physical and logical components for implementing various embodiments. In FIG. 4 various components are identified as engines 38-42. In describing engines 38-42, focus is on each engine's designated function. However, the term engine, as used herein, refers to a combination of hardware and programming configured to perform a designated function. As is illustrated later with respect to FIG. 5, the hardware of each engine, for example, may include one or both of a processor and a memory device, while the programming is code stored on that memory device and executable by the processor to perform the designated function.

FIG. 4 is a block diagram depicting components of system 24 as proxy engine 38, injection engine 40, and control engine 42. FIG. 4 is show to also include proxy tool 44 which may also be a component of system 24. Proxy engine 38 is configured to intercept requests from a client devices and responses to those requests from an application to which the requests are directed and to pass the intercepted requests and responses to their intended destinations.

Injection engine 40 is configured to inject widget code into the application code of responses intercepted by proxy engine 38. In an example, such application code is configured to be processed by a client device to render an application interface also referred to herein as rendered application code. Widget code is code configured to be processed by the client device to insert a widget viewable with the rendered application code. A widget, as used herein, is a user interface having controls for interacting with proxy tool 44, that is, an application different than the application from which the response was received. FIGS. 1 and 2 depict examples of widget 14 viewable with rendered application code 12. For example, the widget code may be an HTML/JavaScript® code snippet that generates an HTML widget in a web browser on the fly during rendering of the application code.

Proxy engine 38 is also responsible for determining whether a request from the client device corresponds to user interaction with the rendered application code or the widget. Upon a determination that an intercepted request from the client device corresponds to user interaction with the rendered application code and not the widget, proxy engine passes the request to the application. Conversely, that request is passed to control engine 42 which is configured to modify a state of proxy tool 44 based on the given request.

Proxy tool 44 represent a tool for processing communications passing through a proxy server device. Proxy tool 44, for example may be a recording tool configured to record data from a client device and corresponding responses intercepted by proxy engine 38 before they are passed on to their intended destination. The recorded data, for example, can be used to assemble a script that can later be replayed to simulate a real user when testing the application. In changing a state of proxy tool 44, control engine 42 may selectively cause proxy tool 44 to record, pause recording, stop recording, or to execute some other specified action.

Upon a determination that an intercepted request from the client device corresponds to user interaction with the widget, injection engine 40 may return a response with updated widget code that when processed by the client device causes an update to the widget viewable with the rendered application code. Such an update may communicate a change in status or state of recording tool 44. For example, the updated widget may indicate that recording has started, paused or stopped. The updated widget may have updated controls for interacting with recording tool 44 in its changed state. Communication between the widget and system 24 may utilize ajax calls or calls of another asynchronous protocol such that the widget may be refreshed without re-rendering the application code.

When injecting widget code, injection engine 40 may do so such that widget code that when processed with the application code by the client device, the widget code inserts a widget that overlays the rendered application code such as in FIG. 1. The widget code, when processed, may instead insert a widget that does not overlay but is displayed simultaneously with the rendered application code such as depicted in FIG. 2. The selection of which alternative is used may be made based on user input entered through the widget or another interface. The selection may also be made based on the display characteristics of the client device and the complexity of the application code. For example, complex application code when rendered may result in an interface with more densely packed controls depending on the size of display. Here it may be appropriate to display the widget adjacent to the application interface such as in FIG. 2. Where the application code is less complex, a widget overlay may be appropriate as depicted in FIG. 1.

In foregoing discussion, engines 38-42 were described as combinations of hardware and programming. Engines 38-42 may be implemented in a number of fashions. Looking at FIG. 5, the programming may be processor executable instructions stored on tangible memory resource 46 and the hardware may include processing resource 48 for executing those instructions. Thus memory resource 46 can be said to store program instructions that when executed by processing resource 48 implements system 24 of FIG. 4.

Memory resource 46 represents generally any number of memory components capable of storing instructions that can be executed by processing resource 48. Memory resource 46 is non-transitory in the sense that it does not encompass a transitory signal but instead is made up of more or more memory components configured to store the relevant instructions. Memory resource 46 may be implemented in a single device or distributed across devices. Likewise, processing resource 48 represents any number of processors capable of executing instructions stored by memory resource 46. Processing resource 48 may be integrated in a single device or distributed across devices. Further, memory resource 46 may be fully or partially integrated in the same device as processing resource 48, or it may be separate but accessible to that device and processing resource 48.

In one example, the program instructions can be part of an installation package that when installed can be executed by processing resource 48 to implement system 24. In this case, memory resource 46 may be a portable medium such as a CD, DVD, or flash drive or a memory maintained by a server from which the installation package can be downloaded and installed. In another example, the program instructions may be part of an application or applications already installed.

Here, memory resource 48 can include integrated memory such as a hard drive, solid state drive, or the like.

In FIG. 5, the executable program instructions stored in memory resource 46 are depicted as proxy module 50, injection module 52, and control module 54. Proxy module 50 represents program instructions that when executed cause processing resource 46 to implement proxy engine 38 of FIG. 4. Injection module 52 represents program instructions that when executed cause the implementation of injection engine 40. Likewise, control module 54 represents program instructions that when executed cause the implementation of control engine 42.

Figure 6:
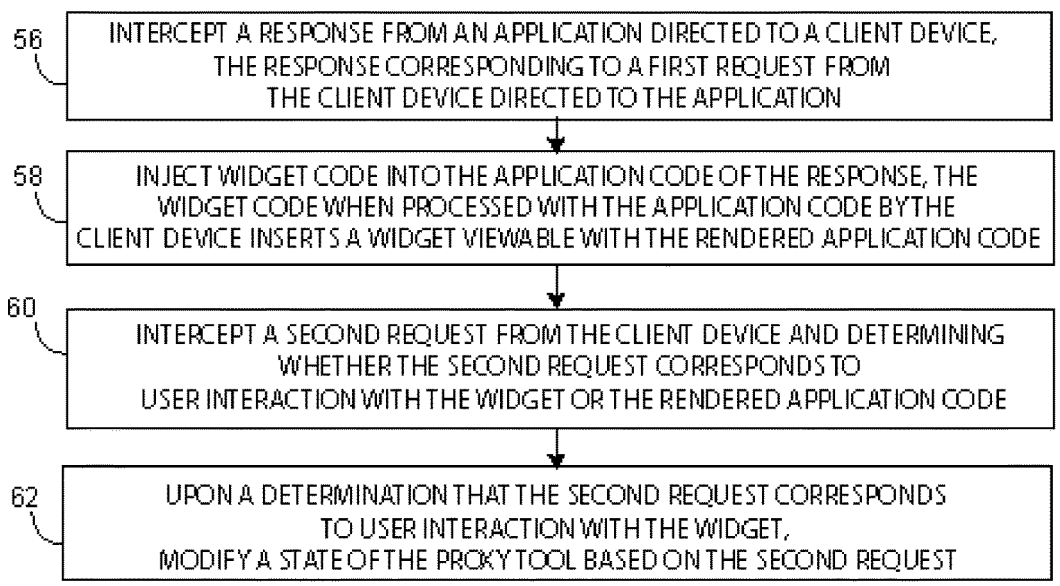
FIG. 6 is a flow diagram depicting steps taken to implement an example.

Operation:

FIG. 6 is a flow diagram of steps taken to implement a method for controlling a proxy tool. In discussing FIG. 6, reference may be made to components depicted in FIGS. 1-5. Such reference is made to provide contextual examples and not to limit the manner in which the method depicted by FIG. 6 may be implemented.

A response from an application directed to a client device is intercepted (step 56). The response corresponds to a previous request from the client device directed to the application. Referring to FIG. 4, proxy engine 38 may be responsible for implementing step 56. Before passing the response on to the client device, widget code is injected into the application code of the response (step 58). The widget code when processed with the application code by the client device inserts a widget viewable with the rendered application code. Referring to FIG. 4, injection engine 40 may be responsible for implementing step 58. Again, FIGS. 1 and 2 provide examples of a widget 14 viewable with rendered application code 12.

A subsequent request from the client device directed to the application is intercepted, and it is determined whether that subsequent request corresponds to user interaction with the widget or the rendered application code (step 60). Such interaction, for example may be the selection of a control provided by the widget or the rendered application code. The determination can be made, for example, through address matching. Selection of a control causes the client device to send a request directed to an address such as an URL Uniform resource Locator). The address used by a control from the rendered application code will correspond to the application. An address used by the widget will at least indirectly correspond to the proxy tool.

Upon a determination that the second request corresponds to user interaction with the widget, a state of the proxy tool is modified based on the subsequent request (step 62). Referring to FIG. 4, control engine 42 may be responsible for implementing step 62. Where the proxy tool is a recording tool, state modification may include selectively instructing the recording tool to record data from subsequent intercepted requests from the client device directed to the application, to record data from subsequent intercepted responses and, to stop such recording.

The application code when rendered may include controls for interacting with the application. Likewise, the widget may have controls for interacting with the proxy tool. Thus determining, in step 60 can include determining if the user interacted with a control of the widget or a control of the rendered application code. As explained above, such may be accomplished through address matching.

Following a determination in step 60 that the subsequent request from the client device corresponds to user interaction with the widget and not the rendered application code, updated widget code may be returned to the client device. When processed, the updated widget code causes an update to the widget viewable with the rendered application code. Such an update may reflect the change in state of the proxy tool. Such an update may include new controls for interacting with the proxy tool in its updated state. Thus, upon a determination that the request resulted from interaction with a control of the rendered application code, that request is passed on to the application. Upon a determination that the request resulted from interaction with a widget control, the state of the proxy tool is updated accordingly.

Injecting in step 60 may include injection widget code that when processed with the application code by the client device, the widget code inserts a widget that overlays the rendered application code such as in FIG. 1. The widget code, when processed, may instead insert a widget that does not overlay but is displayed simultaneously with the rendered application code such as depicted in FIG. 2. The selection of which alternative is used may be made based on user input entered through the widget or another interface. The selection may also be made based on the display characteristics of the client device and the complexity of the application code. For example, complex application code when rendered may result in an interface with more densely packed controls depending on the size of display. Here it may be appropriate to display the widget adjacent to the application interface such as in FIG. 2. Where the application code is less complex, a widget overlay may be appropriate as depicted in FIG. 1.

CONCLUSION

FIGS. 1 and 2 depict example screen views of a widget viewable with rendered application code. The layouts and content are mere examples. FIGS. 3-5 aid in depicting the architecture, functionality, and operation of various embodiments. In particular, FIGS. 4-5 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 6 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A non-transitory memory resource storing instructions that when executed cause a processing resource to:
   inject widget code into application code of a response to an application request, the response to be returned to a client device, the widget code when processed with the application code by the client device inserts a widget viewable with the rendered application code;
   upon a determination that a subsequent request from the client device corresponds to user interaction with the widget and not the rendered application code, modify a state of a proxy tool based on the subsequent request; and
   upon a determination that the subsequent request from the client device corresponds to user interaction with the widget and not the rendered application code, return a response with updated widget code that when processed by the client device causes an update to the widget viewable with the rendered application code.

2. The memory resource of claim 1, wherein:
   the application code when rendered includes controls for interacting with the application; the widget code, when processed inserts a widget having controls for interacting with the proxy tool.

3. The memory resource of claim 2, wherein the instructions are further to cause the processing resource to:
   determine whether a subsequent request from the client device corresponds to user interaction with the controls of the rendered application code or the controls of the widget;
   pass the subsequent request to the control module upon a determination that the subsequent request corresponds to user interaction with the controls of the widget;
   pass the subsequent request to the application upon a determination that the subsequent request corresponds to user interaction with the controls of the rendered application code.

4. The memory resource of claim 1, wherein the instructions are further to cause the processing resource to selectively inject one of:
   widget code that, when processed with the application code by the client device, inserts a widget that overlays the rendered application code; or
   widget code that, when processed with the application code by the client device, inserts a widget that does not overlay but is displayed simultaneously with the rendered application code.

5. The memory resource of claim 1, wherein the proxy tool is a recording tool and wherein:
   the instructions are further to cause the processing resource to:
      intercept requests from the client device and responses to the requests from the application;
      upon a determination that the subsequent request from the client device corresponds to user interaction with the widget, modify a state of the recording tool such that the recording tool records data from future subsequent requests from the client device.

6. A system for controlling a proxy tool comprising:
   at least one processor;
   a non-transitory computer readable medium storing machine readable instructions that when executed by at least one processor, cause the at least one processor to:
   intercept requests from a client devices and responses to those requests from an application to which the requests are directed and to pass the intercepted requests and responses to their intended destinations;
   inject widget code into application code of the intercepted responses, the intercepted responses to be passed to the client device, the widget code when processed with the application code by the client device inserts a widget viewable with the rendered application code;
   upon a determination that given one of the intercepted requests from the client device corresponds to user interaction with the widget and not the rendered application code, modify a state of the proxy tool based on the given request; and
   upon a determination that a given one of the intercepted requests the requests from the client device corresponds to user interaction with the widget, return a response with updated widget code that when processed by the client device causes an update to the widget viewable with the rendered application code.

7. The system of claim 6, wherein the application code when rendered includes controls for interacting with the application, and the widget code, when processed inserts a widget having controls for interacting with the proxy tool and wherein the instructions are further to cause the at least one processor to:
   determine whether a particular one of the intercepted requests from the client device corresponds to user interaction with the controls of the rendered application code or the controls of the widget;
   pass the particular request to the control module upon a determination that the particular request corresponds to user interaction with the controls of the widget; and
   pass the particular request to the application upon a determination that the particular request corresponds to user interaction with the controls of the rendered application code.

8. The system of claim 6, wherein the proxy tool is a recording tool and wherein:
   the instructions are further to cause the at least one processor to, upon a determination that the given request corresponds to user interaction with the widget, modify a state of the recording tool such that the recording tool records data from future intercepted requests directed to the application.

9. A method for controlling a proxy tool comprising:
   intercepting a response from an application directed to a client device, the response corresponding to a first request from the client device directed to the application;
   injecting widget code into the application code of the response, the widget code when processed with the application code by the client device inserts a widget viewable with the rendered application code;
   intercepting a second request from the client device and determining whether the second request corresponds to user interaction with the widget or the rendered application code, upon a determination that the second request corresponds to user interaction with the widget, modifying a state of the proxy tool based on the second request, and upon a determination that the second request from the client device corresponds to user interaction with the widget and not the rendered application code, returning a response with updated widget code that when processed by the client device causes an update to the widget viewable with the rendered application code.

10. The method of claim 9, wherein the proxy tool is a recording tool and wherein modifying comprises selectively instructing the recording tool to:

record data from subsequent intercepted requests from the client device directed to the application; and stop such recording.

11. The method of claim 9, wherein;

the application code when rendered includes controls for interacting with the application, and the widget code, when processed inserts a widget having controls for interacting with the proxy tool;

determining comprises determining whether the second request corresponds to user interaction with the controls of the rendered application code or the controls of the widget;

the method comprises passing the subsequent request to the application upon a determination that the subsequent request corresponds to user interaction with the controls of the rendered application code; and modifying comprises modifying the state of the proxy tool based on the second request only upon a determination that the second request corresponds to user interaction with the controls of the widget.

12. The method of claim 9, wherein injecting includes at least one of:

injecting widget code that, when processed with the application code by the client device, inserts a widget that overlays the rendered application code; or injecting widget code that, when processed with the application code by the client device, inserts a widget that does not overlay but is displayed simultaneously with the rendered application code.

* * * * *